(12) United States Patent
Lee et al.

(10) Patent No.: US 12,051,773 B2
(45) Date of Patent: Jul. 30, 2024

(54) APPARATUS AND METHOD FOR PRESSING SECONDARY BATTERY

(71) Applicant: LG Energy Solution, Ltd., Seoul (KR)

(72) Inventors: Jung Pil Lee, Daejeon (KR); Ye Eun Kim, Daejeon (KR); Jeong Beom Lee, Daejeon (KR)

(73) Assignee: LG Energy Solution, Ltd., Seoul (KR)

(*) Notice: Subject to any disclaimer, the term of this patent is extended or adjusted under 35 U.S.C. 154(b) by 40 days.

(21) Appl. No.: 17/786,248

(22) PCT Filed: Feb. 5, 2021

(86) PCT No.: PCT/KR2021/001568
§ 371 (c)(1),
(2) Date: Jun. 16, 2022

(87) PCT Pub. No.: WO2021/162361
PCT Pub. Date: Aug. 19, 2021

(65) Prior Publication Data
US 2023/0048295 A1 Feb. 16, 2023

(30) Foreign Application Priority Data
Feb. 13, 2020 (KR) .................. 10-2020-0017844

(51) Int. Cl.
*H01M 10/04* (2006.01)
*H01M 50/105* (2021.01)
(Continued)

(52) U.S. Cl.
CPC ... *H01M 10/0404* (2013.01); *H01M 10/0481* (2013.01); *H01M 50/105* (2021.01);
(Continued)

(58) Field of Classification Search
CPC ... B29C 33/301; B29C 33/305; B29C 33/308; B29C 65/02; B29C 66/1122;
(Continued)

(56) References Cited

U.S. PATENT DOCUMENTS 558,438 A 4/1896 Kim et al.
2002/0157242 A1 10/2002 Fukuda et al.
(Continued)

FOREIGN PATENT DOCUMENTS

CN 102598391 A 7/2012
CN 104603979 A 5/2015
(Continued)

OTHER PUBLICATIONS

International Search Report for PCT/KR2021/001568 dated May 20, 2021. 3 pgs.
(Continued)

*Primary Examiner* — Lingwen R Zeng
(74) *Attorney, Agent, or Firm* — Lerner David LLP

(57) ABSTRACT

An apparatus for pressing a secondary battery comprises a disposing member on which the secondary battery comprising an electrode assembly and a pouch is disposed, and a pressing member configured to press the secondary battery disposed on the disposing member, wherein the pressing member comprises an accommodation part pressing jig configured to press an accommodation part of the pouch, in which the electrode assembly is accommodated, in the pouch of the secondary battery disposed on the disposing member, and a sealing part pressing jig configured to press a sealing part formed along an edge surface of the accommodation part in the pouch of the secondary battery disposed on the disposing member, wherein the sealing part pressing jig is coupled to a surface of the accommodation part pressing jig corresponding to the sealing part to press the
(Continued)

sealing part through pressing force transmitted from the accommodation part pressing jig.

15 Claims, 12 Drawing Sheets

(51) Int. Cl.
*H01M 50/116* (2021.01)
*H01M 50/186* (2021.01)
*B29C 33/30* (2006.01)
*B29C 65/00* (2006.01)
*B29C 65/02* (2006.01)
*B29L 31/00* (2006.01)
*B29L 31/34* (2006.01)

(52) U.S. Cl.
CPC ....... *H01M 50/116* (2021.01); *H01M 50/186* (2021.01); *B29C 33/301* (2013.01); *B29C 33/305* (2013.01); *B29C 33/308* (2013.01); *B29C 65/02* (2013.01); *B29C 66/1122* (2013.01); *B29C 66/133* (2013.01); *B29C 66/24244* (2013.01); *B29C 66/244* (2013.01); *B29C 66/342* (2013.01); *B29C 66/433* (2013.01); *B29C 66/81427* (2013.01); *B29C 66/81457* (2013.01); *B29C 66/81611* (2013.01); *B29C 66/8322* (2013.01); *B29C 66/8432* (2013.01); *B29L 2031/3468* (2013.01); *B29L 2031/7146* (2013.01)

(58) Field of Classification Search
CPC ............ B29C 66/133; B29C 66/24244; B29C 66/244; B29C 66/342; B29C 66/433; B29C 66/81427; B29C 66/81457; B29C 66/81611; B29C 66/8322; B29C 66/8432; B29L 2031/3468; B29L 2031/7146; H01M 10/0404; H01M 10/0481; H01M 50/105; H01M 50/116; H01M 50/186
See application file for complete search history.

(56) References Cited

U.S. PATENT DOCUMENTS

| | | | |
|---|---|---|---|
| 2012/0216394 A1 | 8/2012 | Kitaura et al. | |
| 2013/0244093 A1* | 9/2013 | Min | H01M 10/52 429/185 |
| 2015/0270585 A1 | 9/2015 | Sasaoka et al. | |
| 2016/0049682 A1 | 2/2016 | Won et al. | |
| 2018/0047950 A1 | 2/2018 | Lim et al. | |
| 2018/0183088 A1 | 6/2018 | Kim et al. | |
| 2018/0205107 A1 | 7/2018 | Lee et al. | |
| 2018/0261807 A1 | 9/2018 | Lim | |
| 2019/0184502 A1 | 6/2019 | Kim et al. | |
| 2019/0372147 A1 | 12/2019 | Matsumura et al. | |
| 2020/0112001 A1 | 4/2020 | Jung et al. | |

FOREIGN PATENT DOCUMENTS

| | | |
|---|---|---|
| CN | 204947325 U | 1/2016 |
| CN | 205457212 U | 8/2016 |
| CN | 206075822 U | 4/2017 |
| CN | 108281694 A | 7/2018 |
| CN | 109244301 A | 1/2019 |
| CN | 109994659 A | 7/2019 |
| JP | S62188161 A | 8/1987 |
| JP | 2001283799 A | 10/2001 |
| JP | 2001297798 A | 10/2001 |
| JP | 2005116228 A | 4/2005 |
| JP | 2012234670 A | 11/2012 |
| JP | 2013211206 A | 10/2013 |
| JP | 2015179566 A | 10/2015 |
| JP | 2016181345 A | 10/2016 |
| JP | 2018006223 A | 1/2018 |
| KR | 20110137740 A | 12/2011 |
| KR | 20140138383 A | 12/2014 |
| KR | 20150037305 A | 4/2015 |
| KR | 20150062387 A | 6/2015 |
| KR | 20150089555 A | 8/2015 |
| KR | 20160062870 A | 6/2016 |
| KR | 20170071759 A | 6/2017 |
| KR | 20170087250 A | 7/2017 |
| KR | 20170110300 A | 10/2017 |
| KR | 2018-0028714 A | 3/2018 |
| KR | 20180025805 A | 3/2018 |
| KR | 20180038181 A | 4/2018 |
| KR | 20180093598 A | 8/2018 |
| KR | 20190046990 A | 5/2019 |
| WO | 2011052094 A1 | 5/2011 |
| WO | 2020004343 A1 | 1/2020 |

OTHER PUBLICATIONS

Extended European Search Report for Application No. 21754026.9 dated Jan. 25, 2023. 11 pgs.

* cited by examiner

APPARATUS AND METHOD FOR PRESSING SECONDARY BATTERY

CROSS-REFERENCE TO RELATED APPLICATION

The present application is a national stage entry under 35 U.S.C. § 371 of International Application No. PCT/KR2021/001568, filed on Feb. 5, 2021, published in Korean, which claims the priority to Korean Patent Application No. 10-2020-0017844, filed on Feb. 13, 2020, which are hereby incorporated by reference herein in their entireties.

TECHNICAL FIELD

The present invention relates to an apparatus and method for pressing a secondary battery.

BACKGROUND ART

In general, secondary batteries refer to chargeable and dischargeable batteries, unlike primary batteries that are not chargeable. The secondary batteries are being widely used in the high-tech electronic fields such as mobile phones, notebook computers, and camcorders.

The secondary batteries are classified into a can type secondary battery and a pouch type secondary battery, and the pouch type secondary battery comprises an electrode assembly, an electrolyte, and a pouch accommodating the electrode assembly and the electrolyte. Also, the electrode assembly has a structure in which electrodes and separators are alternately stacked. Also, the pouch comprises an accommodation part accommodating the electrode assembly and a sealing part that seals the accommodation part.

The secondary battery is pressed at a uniform pressure to improve performance and extend its lifespan. Here, the secondary battery has a problem in that the sealing part of the pouch is vented by a gas pressure generated inside the pouch.

DISCLOSURE OF THE INVENTION

Technical Problem

The present invention was invented to solve the above problems, and an object of the present invention is to provide an apparatus and method for pressing a secondary battery, in which when the secondary battery is pressed, a sealing part comprised in a pouch is pressed together to prevent the sealing part from being vented by a gas pressure generated in an accommodation part comprised in the pouch, thereby stably press the secondary battery to improve performance and extend its lifespan.

Technical Solution

An apparatus for pressing a secondary battery according to the present invention for achieving the above object comprises: a disposing member on which the secondary battery comprising an electrode assembly and a pouch is disposed; and a pressing member configured to press the secondary battery disposed on the disposing member, wherein the pressing member comprises: an accommodation part pressing jig configured to press an accommodation part of the pouch, in which the electrode assembly is accommodated, in the pouch of the secondary battery disposed on the disposing member; and a sealing part pressing jig configured to press a sealing part formed along an edge surface of the accommodation part in the pouch of the secondary battery disposed on the disposing member, wherein the sealing part pressing jig is coupled to a surface of the accommodation part pressing jig corresponding to the sealing part to press the sealing part through pressing force transmitted from the accommodation part pressing jig.

The sealing part pressing jig may be formed by assembling a plurality of pressing blocks having an area corresponding to the sealing part.

The plurality of pressing blocks may comprise a first pressing block coupled to the accommodation part pressing jig, a second pressing block configured to press the sealing part, and one or more third pressing blocks disposed between the first pressing block and the second pressing block.

Each of the first and second pressing block may have rigidity greater than that of each of the third pressing blocks.

Each of the third pressing blocks may be made of a material having elastic restoring force.

The pressing surface of the second pressing block configured to press the sealing part may comprise a plurality of pressing protrusions to press the sealing part in multiple stages.

The sealing part pressing jig may be coupled to be detachable to the accommodation part pressing jig.

The sealing part pressing jig may be coupled to be adjustable in position in a direction toward or opposite to a center of the accommodation part pressing jig.

An elastic member configured to elastically press the pouch accommodation part may be disposed on a pressing surface of the accommodation part pressing jig configured to the accommodation part of the pouch.

A method for pressing a secondary battery according to the present invention comprises: a disposing step (S10) of disposing a secondary battery comprising an electrode assembly and a pouch on a disposing member; and a pressing step (S20) of pressing the secondary battery disposed on the disposing member through a pressing member, wherein the pressing step (S20) comprises: a first pressing process of pressing an accommodation part of a pouch, in which the electrode assembly is accommodated, in the pouch of the secondary battery disposed on the disposing member through an accommodation part pressing jig of the pressing member; and a second pressing process of pressing a sealing part formed along an edge surface of the accommodation part in the pouch of the secondary battery disposed on the disposing member through a sealing part pressing jig of the pressing member, wherein the sealing part pressing jig is coupled to the accommodation part pressing jig corresponding to the sealing part to press the sealing part with pressing force transmitted from the accommodation part pressing jig.

The method may further comprise an assembly step (S15) of assembling the sealing part pressing jig between the disposing step (S10) and the pressing step (S20), wherein, in the assembly step (S15), a plurality of pressing blocks having an area corresponding to the sealing part may be prepared, and the plurality of pressing blocks may comprise a first pressing block, a second pressing block, and one or more third pressing blocks.

In the assembly step (S15), the first pressing block may be coupled to the accommodation part pressing jig, the second pressing block pressing the sealing part may be disposed outside the first pressing block, and the one or more third pressing blocks may be disposed between the first and second pressing blocks to assemble the sealing part pressing jig.

Each of the first and second pressing block may be made of a material having rigidity greater than that of each of the third pressing blocks, and the third pressing block may be made of a material having elastic restoring force.

The method may further comprise a coupling step (S17) of coupling the sealing part pressing jig to the accommodation part pressing jig between the assembly step (S15) and the pressing step (S20), wherein, in the coupling step (S17), the sealing part pressing jig may be disposed on a surface of the accommodation part pressing jig corresponding to the sealing part of the pouch disposed on the disposing member, and a bolt may pass through a long hole formed in a surface of the sealing part pressing jig so as to be coupled to the sealing part pressing jig so that the sealing part pressing jig is coupled to the accommodation part pressing jig, wherein the bolt may move within the long hole to adjust a position of the sealing part pressing jig.

The pressing step (S20) may further comprise a process of coupling an elastic member, which elastically presses the accommodation part of the pouch, to a pressing surface of the accommodation part pressing jig, which presses the accommodation part of the pouch.

Advantageous Effects

The apparatus for pressing the secondary battery may comprise the disposing member and the pressing member, and the pressing member may comprise the accommodation part pressing jig and the sealing part pressing jig. Due to this feature, the accommodation part and the sealing part of the pouch may be pressed at the same time to prevent the sealing part from being vented by the gas pressure generated in the accommodation part. As a result, the performance and lifespan of the secondary battery may be stably improved.

In addition, in the apparatus for pressing the secondary battery according to the present invention, the sealing part pressing jig may be formed while the plurality of pressing blocks are assembled. Due to this feature, the sealing part pressing jig may be assembled at the same height as the sealing part of the pouch to improve the compatibility.

In addition, in the apparatus for pressing the secondary battery according to the present invention, the plurality of pressing blocks may comprise the first and second pressing blocks and the third pressing block disposed between the first and second pressing blocks, and each of the first and second pressing blocks may have the rigidity greater than that of the third pressing block. Due to this feature, the pressing surface of the sealing part pressing jig that presses the sealing part may be prevented from being deformed to stably press the sealing part of the pouch.

In addition, in the apparatus for pressing the secondary battery according to the present invention, the third pressing block may be made of the material having the elastic restoring force. Due to this feature, the sealing part of the pouch may be elastically pressed to prevent the sealing part from being damaged.

In addition, in the apparatus for pressing the secondary battery according to the present invention, the plurality of pressing protrusions may be formed on the pressing surface of the second pressing block for pressing the sealing part. Due to this feature, the sealing part of the pouch may be pressed in multiple stages to significantly prevent the sealing part from being vented.

In addition, in the apparatus for pressing the secondary battery according to the present invention, the sealing part pressing jig may be detachably coupled to the accommodation part pressing jig. Due to this feature, the ease of maintenance may be improved, and since the sealing part pressing jig having various sizes and areas is replaceable, the compatibility may be improved.

In addition, in the apparatus for pressing the secondary battery according to the present invention, the elastic member may be provided on the pressing surface of the accommodation part pressing jig for pressing the accommodation part of the pouch. Due to this feature, the accommodation part of the pouch may be elastically pressed to prevent the accommodation part from being damaged or marked.

MODE FOR CARRYING OUT THE INVENTION

Figure 1:
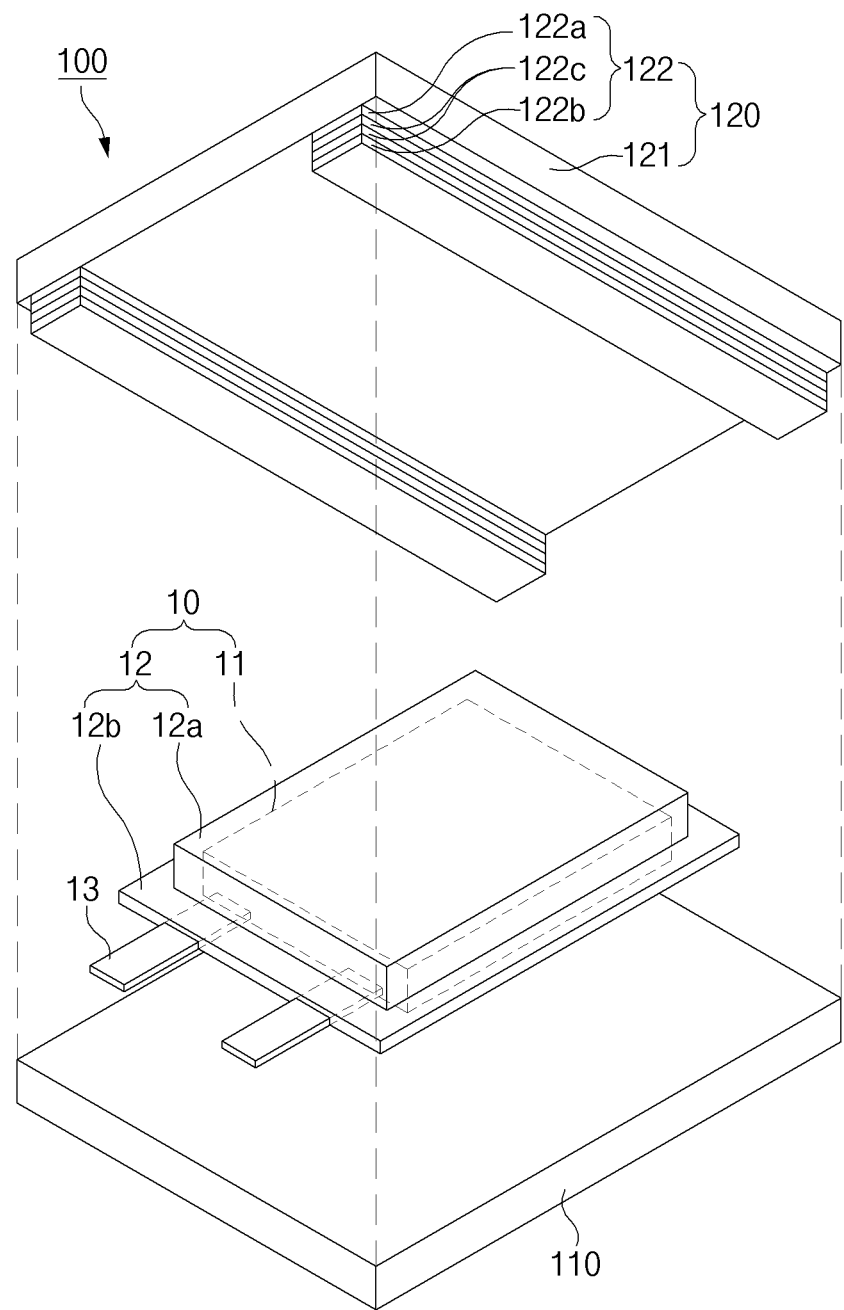
FIG. 1 is an exploded perspective view of an apparatus for pressing a secondary battery according to a first embodiment of the present invention.
Figure 2:
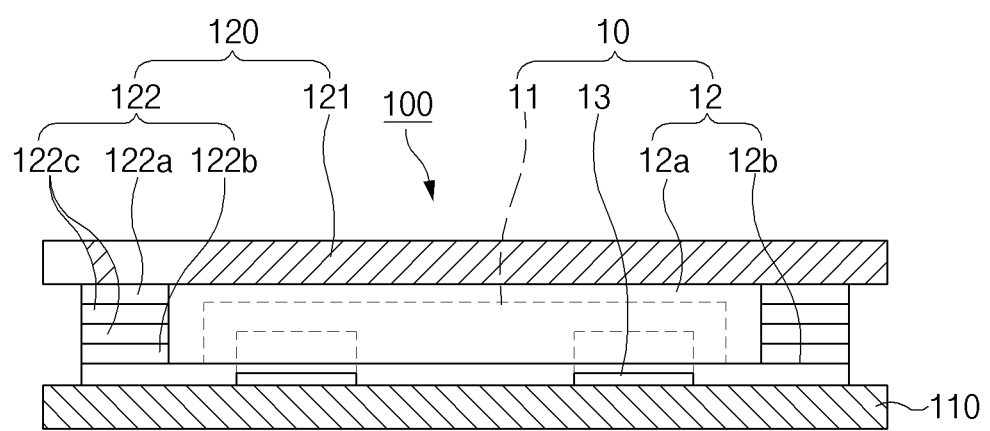
FIG. 2 is a cross-sectional view of FIG. 1.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

[Secondary Battery According to the Present Invention]

As illustrated n FIG. 1, a secondary battery 10 according to the present invention comprises an electrode assembly 11, a pouch 12 accommodating the electrode assembly 11, and an electrode lead 13 which is connected to the electrode assembly 11 and of which a front end is drawn out of the pouch.

The electrode assembly 11 has a structure in which electrodes and separators are alternately stacked, and the pouch 12 comprises an accommodation part 12a accommodating the electrode assembly 11 and a sealing part 12b provided along an edge surface of the accommodation part 12a to seal the accommodation part 12a.

The secondary battery 10 having the above structure is pressed at a uniform pressure to improve battery performance and extend battery lifespan. Here, an apparatus for pressing according to a first embodiment of the present application is used. Particularly, the apparatus for pressing according to the first embodiment of the present application may press the accommodation part 12a and the sealing part 12b of the pouch 12 together. Thus, when the secondary battery is pressed, the sealing part 12b may be prevented from being vented, and thus, the secondary battery 10 may be pressed at the uniform pressure to improve the battery performance and lifespan.

Hereinafter, an apparatus for pressing a secondary battery according to a first embodiment of the present application will be described in detail.

[Apparatus for Pressing Secondary Battery According to First Embodiment of the Present Invention]

As illustrated in FIGS. 1 to 5, an apparatus 100 for pressing a secondary battery according to a first embodiment of the present invention comprises a disposing member 110 on which a secondary battery 10 comprising an electrode assembly 11 and a pouch 12 is disposed and a pressing member 120 disposed to be movable toward the secondary battery 10 disposed on the disposing member 110 so as to press the secondary battery 10 disposed on the disposing member 110.

Here, the pressing member 120 may press an accommodation part 12a and a sealing part 12b of the pouch 12 together to prevent the sealing part 12b from being vented by a gas pressure generated in the accommodation part 12a. That is, the pressing member 120 may press the sealing part 12b to increase in sealing force of the sealing part 12b, thereby preventing the sealing part 12b from being vented by the gas pressure generated in the accommodation part 12a.

For example, the pressing member 120 comprises an accommodation part pressing jig 121 pressing the accommodation part 12a of the pouch 12, in which the electrode assembly 11 is accommodated, in the pouch 12 of the secondary battery 10 disposed on the disposing member 110 and a sealing part pressing jig 122 pressing the sealing part 12b formed along an edge surface of the accommodation part 12a in the pouch 12 of the secondary battery 10 disposed on the disposing member 110.

Thus, the pressing member 120 may press the accommodation part 12a and the sealing part 12b of the pouch 12 together through an accommodation part pressing jig 121 and a sealing part pressing jig 122 to increase in sealing force of the sealing part 12b, thereby preventing the sealing part 12b from being vented by a gas pressure generated in the accommodation part 12a.

The sealing part pressing jig 122 is coupled to a surface of the accommodation part pressing jig 121 corresponding to the sealing part 12b. Thus, the sealing part pressing jig 122 may press the sealing part 12b through pressing force transmitted from the accommodation part pressing jig 121.

Figure 3:
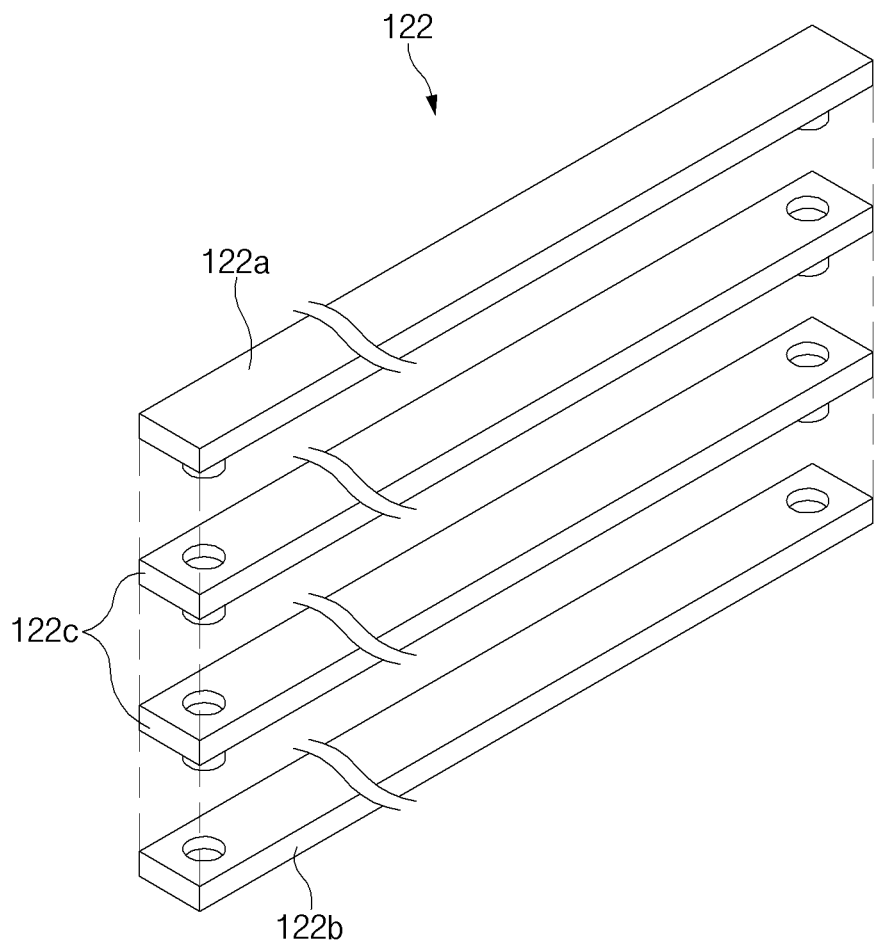
FIG. 3 is an exploded perspective view illustrating a sealing part pressing jig of the apparatus for pressing the secondary battery according to the first embodiment of the present invention.
Figure 4:
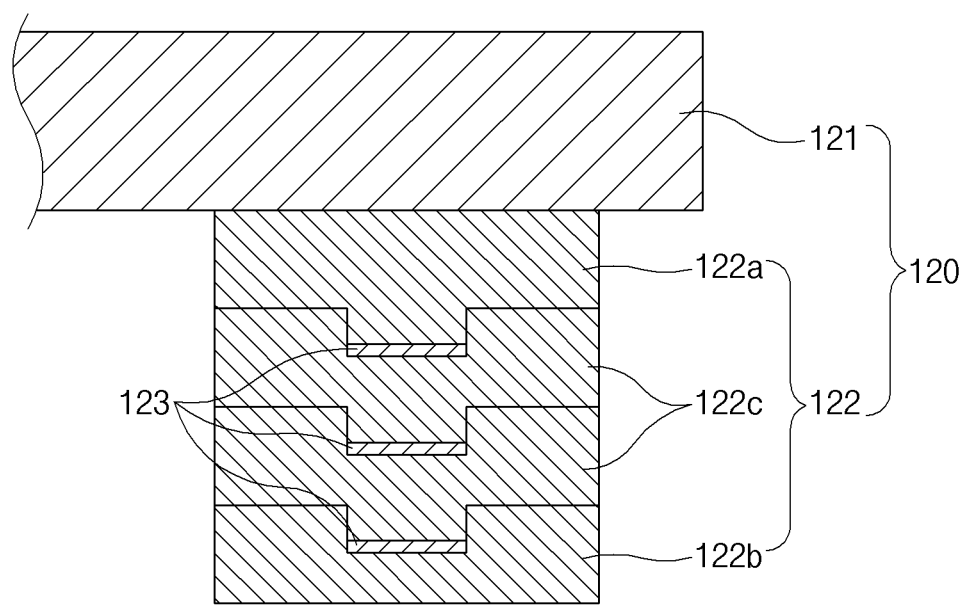
FIG. 4 is a cross-sectional view of FIG. 3.
Figure 5:
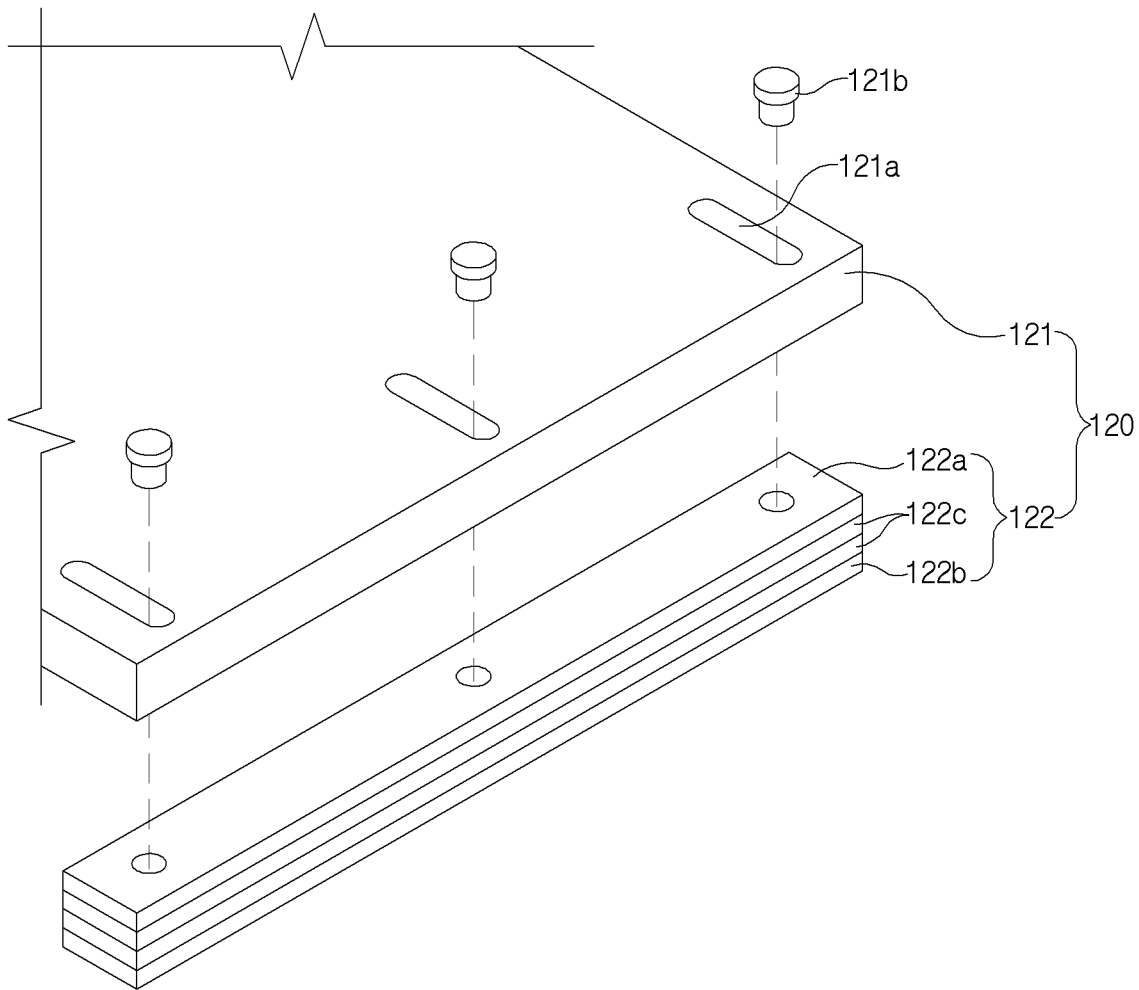
FIG. 5 is a perspective view illustrating a coupling structure between an accommodation part pressing jig and the sealing part pressing jig of the apparatus for pressing the secondary battery according to the first embodiment of the present invention.

The sealing part pressing jig 122 is formed by assembling a plurality of pressing blocks having an area corresponding to the sealing part 12b. That is, the plurality of pressing blocks are assembled to the sealing part pressing jig 122 while being coupled in a vertical direction as illustrated in FIG. 3. Thus, only the damaged or deformed pressure block may be replaced to be reused, and in particular, a height of the sealing part pressing jig 122 may be adjusted according to a height of the sealing part 12b to increase in compatibility.

That is, the plurality of pressing blocks may be adjusted to have the same height as the sealing part 12b, may be adjusted to a height less than that of the sealing part 12b, and may be adjusted to a height greater than that of the sealing part 12b.

The plurality of pressing blocks have the form of a Lego block having grooves and protrusions that are coupled to each other to improve convenience in assembly and disassembly. That is, a coupling groove is formed in a coupling surface of one pressing block, and a coupling protrusion coupled to the coupling groove is formed on a coupling surface of the other pressing block. The coupling groove and the coupling protrusion are coupled to each other. Here, the plurality of assembled pressure blocks may adhere by an adhesive 123 so as not to be easily separated.

The plurality of pressing blocks comprise a first pressing block 122a coupled to the accommodation part pressing jig 121, a second pressing block 122b pressing the sealing part 12b, and one or more third pressing blocks 122c disposed between the first pressing block 122a and the second pressing block 122b. That is, referring to FIG. 3, in the plurality of pressing blocks, the first pressing block 122a, one or more third pressing blocks 122c, and the second pressing block 122b are sequentially coupled to each other in the vertical direction.

Here, each of the first pressing block 122a and the second pressing block 122b has rigidity greater than that of the third pressing block 122c. Thus, the first pressing block 122a may be effectively coupled to the accommodation part pressing jig 121 to effectively press the sealing part 12b through the second pressing block 122b and may effectively receive pressing force transmitted from the first pressing block 122a or the second pressing block 122b through one or more third pressing blocks 122c to maintain a uniform pressing force.

Particularly, the third pressing block 122c may be made of a synthetic resin, which is a material having elastic restoring force to effectively receive the pressing force transmitted from the first pressing block 122a or the second pressing block 122b.

The sealing part pressing jig 122 is detachably coupled to the accommodation part pressing jig 121. That is, when a bolt 121b passing through a long hole 121a formed in the accommodation part pressing jig 121 is coupled to the sealing part pressing jig 122, the sealing part pressing jig 122 and the accommodation part pressing jig 121 may be coupled to each other, and when the bolt 121b is released, the sealing part pressing jig 122 and the accommodation part pressing jig 121 may be separated from each other.

The sealing part pressing jig 122 is coupled to be adjustable in position in a direction toward or opposite to a center of the accommodation part pressing jig 121. That is, the long hole 121a formed in the accommodation part pressing jig 121 may be formed lengthily in the direction toward the center of the accommodation part pressing jig 121, and when the bolt 121b moves within the long hole 121a, the sealing part pressing jig 122 may move toward the center of the accommodation part pressing jig 121 or opposite to the center of the accommodation part pressing jig 121 in interlock with the bolt 121*b* to adjust the position of the sealing part pressing jig 122.

The sealing part pressing jig 122 having such a structure may effectively press the sealing part of the pouch to improve convenience of use and may be used interchangeably with secondary batteries of various sizes.

Thus, the apparatus 100 for pressing the secondary battery according to the first embodiment of the present invention may comprise the disposing member 110 and the pressing member 120 to press the accommodation part 12*a* and the sealing part 12*b* of the pouch 12 comprised in the secondary battery 10 to increase in sealing force of the sealing part 12*b*, thereby preventing the sealing part 12*b* from being vented by the gas pressure generated in the accommodation part 12*a*.

Hereinafter, a method for pressing the secondary battery by using the apparatus for pressing the secondary battery according to the first embodiment of the present invention will be described.

[Method for Pressing Secondary Battery According to First Embodiment of the Present Invention]

Figure 6:
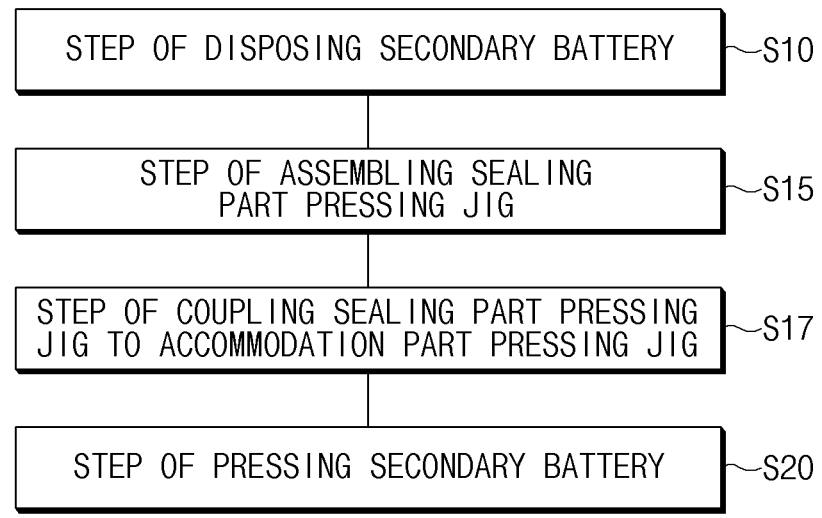
FIG. 6 is a flowchart illustrating a method for pressing the second battery according to the first embodiment of the present invention.

As illustrated in FIG. 6, a method for pressing the secondary battery according to the first embodiment of the present invention comprises a disposing step (S10) of disposing a secondary battery 10 comprising an electrode assembly 11 and a pouch 12 on a disposing member 110, an assembly step (S15) of assembling a sealing part pressing jig 122 of a pressing member 120, a coupling step (S17) of coupling a sealing part pressing jig 122 and an accommodation part pressing jig 121 of the pressing member 120 to each other, and a pressing step (S20) of pressing the secondary battery 10 disposed on the disposing member 110 through the pressing member 120.

Disposing Step

In the disposing step (S10), the secondary battery 10 is disposed on a top surface of the disposing member 110.

The secondary battery 10 comprises the electrode assembly 11 and the pouch 12 accommodating the electrode assembly 11. Here, the pouch 12 comprises a case in which an accommodation space accommodating the electrode assembly 11 is formed and a cover coupled to the case. The pouch 12 having such a structure couples the cover while the electrode assembly is accommodated in the accommodation space of the case. Then, the pouch 12 having an accommodating portion 12*a* accommodating the electrode assembly and a sealing part 12*b* sealing the accommodating portion 12*a* may be manufactured.

The secondary battery 10 is disposed on a top surface of the disposing member 110. Here, the secondary battery 10 is disposed so that the cover is supported by the disposing member 110.

Assembly Step

In the assembly step (S15), a plurality of pressing blocks having an area corresponding to the sealing part 12*b* are prepared, and then, the plurality of pressing blocks are sequentially assembled to complete the sealing part pressing jig 122. For example, the plurality of pressing blocks comprise a first pressing block 122*a*, a second pressing block 122*b*, and one or more third pressing blocks 122*c*. The first pressing block 122*a* prepared as described above is coupled to the accommodation part pressing jig 121 and is disposed at the uppermost end, the second pressing block 122*b* is configured to press the sealing part 12*b* and is disposed at the lowermost end, and one or more third pressing blocks 122*c* is disposed between the first pressing block 122*a* and the second pressing block 122*b*.

Here, each of the first and second pressing blocks 122*a* and 122*b* is made of a material having rigidity greater than that of the third pressing block 122*c*, and thus, the sealing part pressing jig 122 is stably coupled to the accommodation part pressing jig 121 to stably press the sealing part 12*b*. In addition, the third pressing block 122*c* is made of a material having elastic restoring force to elastically press the sealing part 12*b*, thereby preventing the sealing part 12*b* from being damaged.

Coupling Step

In the coupling step (S17), the sealing part pressing jig 122 is coupled to the accommodation part pressing jig 121. That is, in the coupling step (S17), the sealing part pressing jig 122 is disposed on the surface of the accommodation part pressing jig 121 corresponding to the sealing part 12*b* of the pouch 12 disposed on the disposing member 110. Next, the bolt 121*b* passes through a long hole 121*a* formed in the surface of the accommodation part pressing jig 121 and then is coupled to the sealing part pressing jig 122. Then, the sealing part pressing jig 122 and the accommodation part pressing jig 121 are coupled to each other to complete the pressing member 120.

Here, if the bolt 121*b* moves within the long hole 121*a*, the position of the sealing part pressing jig 122 may be adjusted.

Pressing Step

In the pressing step (S20), the pressing member 120 descends toward the secondary battery 10 disposed on the disposing member 110 to press the secondary battery 10 disposed on the disposing member 110. That is, the pressing step (S20) comprises a first pressing process of pressing the accommodation part 12*a* of the pouch 12, in which the electrode assembly 11 is accommodated, in the pouch 12 of the secondary battery 10 disposed on the disposing member 110 through the accommodation part pressing jig 121 of the pressing member 120 and a second pressing process of pressing the sealing part 12*b* formed along an edge surface of the accommodation part 12*a* in the pouch of the secondary battery 10 disposed on the disposing member 110 through the sealing part pressing jig 122 of the pressing member 120.

The sealing part pressing jig 122 may be coupled to the accommodation part pressing jig 121 corresponding to the sealing part 12*b* to press the sealing part 12*b* with pressing force transmitted from the accommodation part pressing jig 121, thereby significantly improving sealing force of the sealing part 12*b*, resulting in preventing the sealing part 12*h* from being vented by the gas pressure generated in the accommodation part 12*a*.

Figure 7:
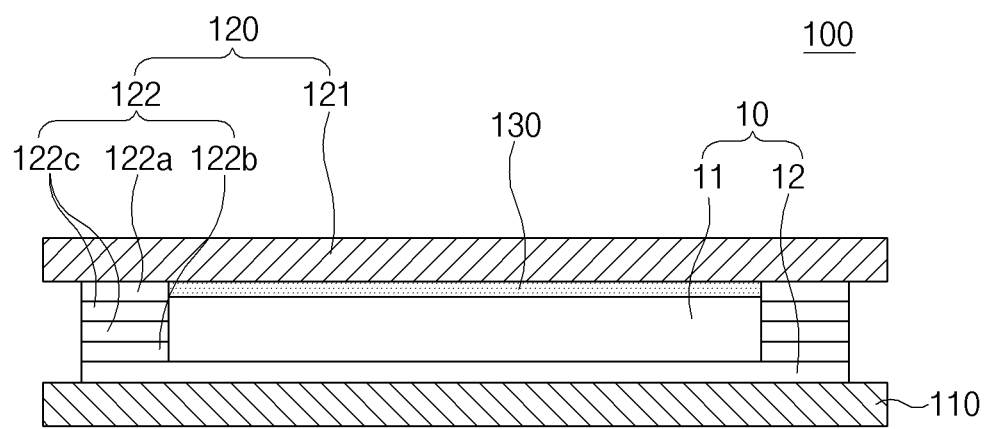
FIG. 7 is a cross-sectional view of an elastic member in the apparatus for pressing the secondary battery according to the first embodiment of the present invention.

As illustrated in FIG. 7, in the pressing step (S20), before pressing the sealing part 12*b*, an elastic member 130 having elasticity is coupled to a pressing surface of the accommodation part pressing jig 121 that presses the accommodation part 12*a* of the pouch 12 to elastically press the accommodation part 12*a* of the pouch, thereby preventing the accommodation part 12*a* from being damaged and marked.

In the pressing step (S20), the elastic member 130 may be attached to the accommodation part or the sealing part of the pouch to more elastically press the accommodation part and the sealing part of the pouch.

Therefore, in the method for pressing the secondary battery according to the first embodiment of the present invention, when the secondary battery is pressed, the accommodation part and the sealing part of the pouch may be pressed together to increase in sealing force of the sealing part, thereby preventing the sealing part from being vented.

Hereinafter, in description of other embodiments of the present invention, the same constituent symbols are used for constituent symbols having the same configuration as the above-described embodiments, and redundant descriptions will be omitted.

[Apparatus for Pressing Secondary Battery According to Second Embodiment of the Present Invention]

Figure 8:
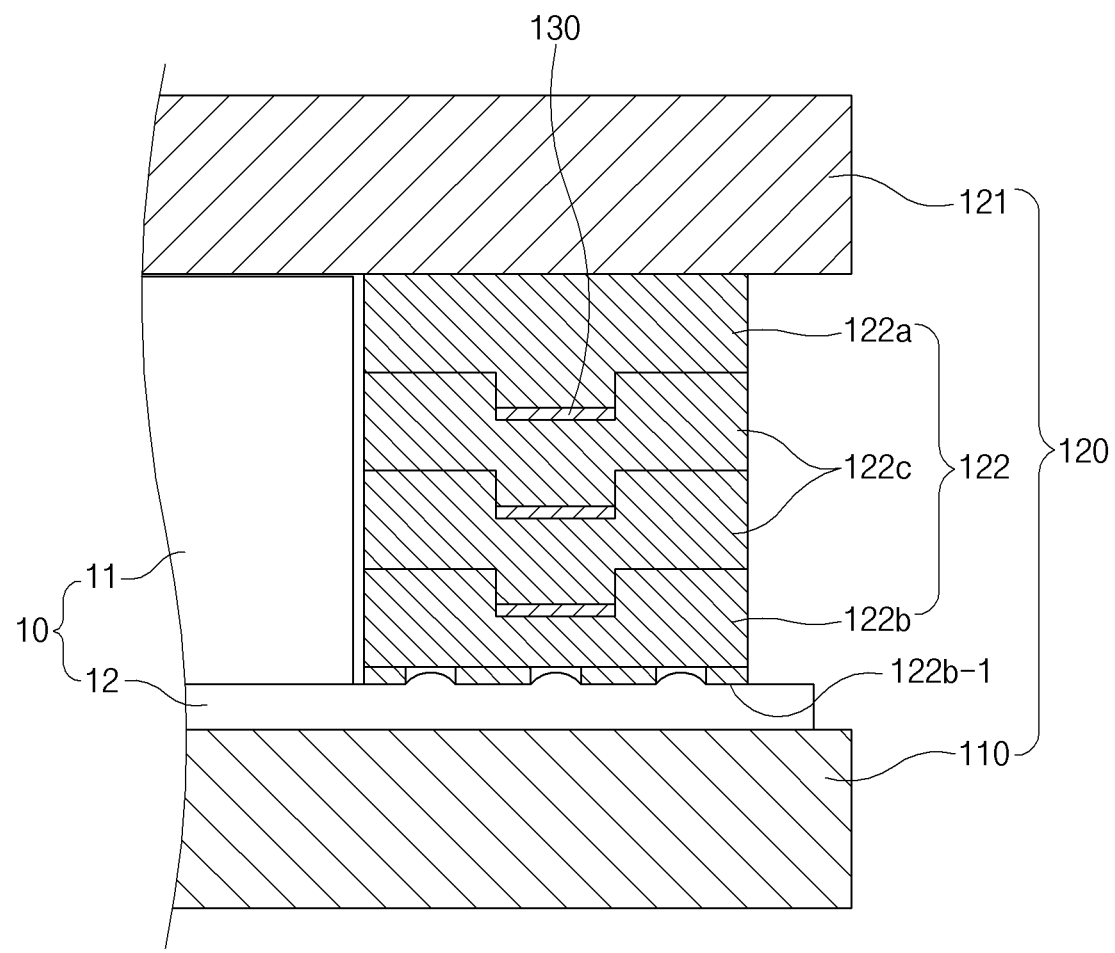
FIG. 8 is a cross-sectional view of an apparatus for pressing a secondary battery according to a second embodiment of the present invention.

As illustrated in FIG. 8, an apparatus 100 for pressing a secondary battery according to a second embodiment of the present invention comprises a sealing part pressing jig 122 pressing a sealing part 12b. The sealing part pressing jig 122 comprises a first pressing block 122a, a second pressing block 122b, and one or more third pressing block 122c.

Here, a plurality of pressing protrusions 122b-1 may be formed on a pressing surface of the second pressing block pressing the sealing part 12b to press the sealing part 12b in multiple stages, and thus, the sealing part 12b may be sealed in multiple stages by the plurality of pressing protrusions 122b-1 to significantly prevent the sealing part 12b from being vented.

[Apparatus for Pressing Secondary Battery According to Third Embodiment of the Present Invention]

Figure 9:
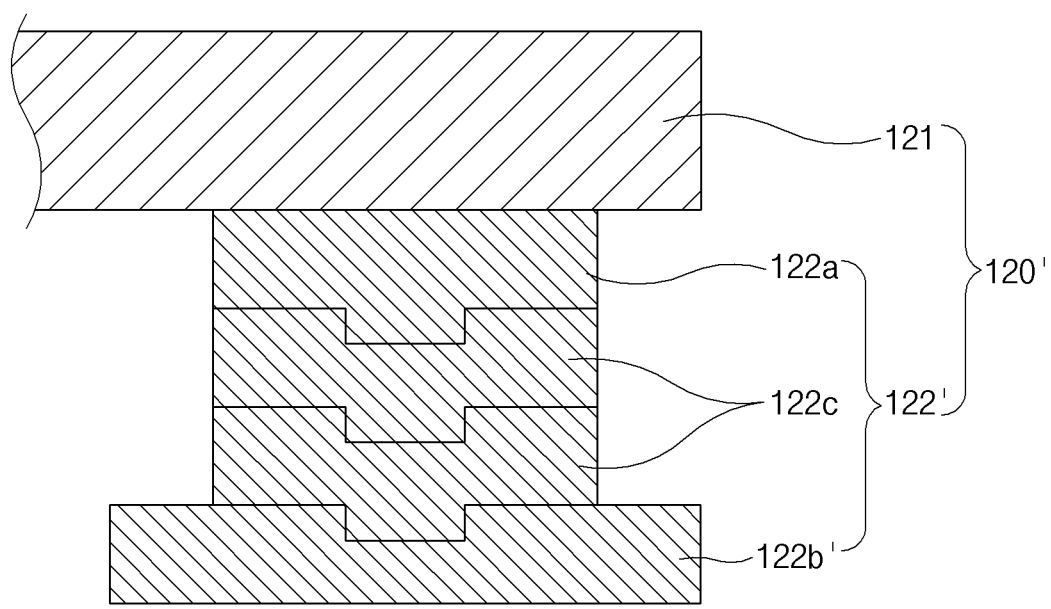
FIG. 9 is a cross-sectional view of an apparatus for pressing a secondary battery according to a third embodiment of the present invention.
Figure 10:
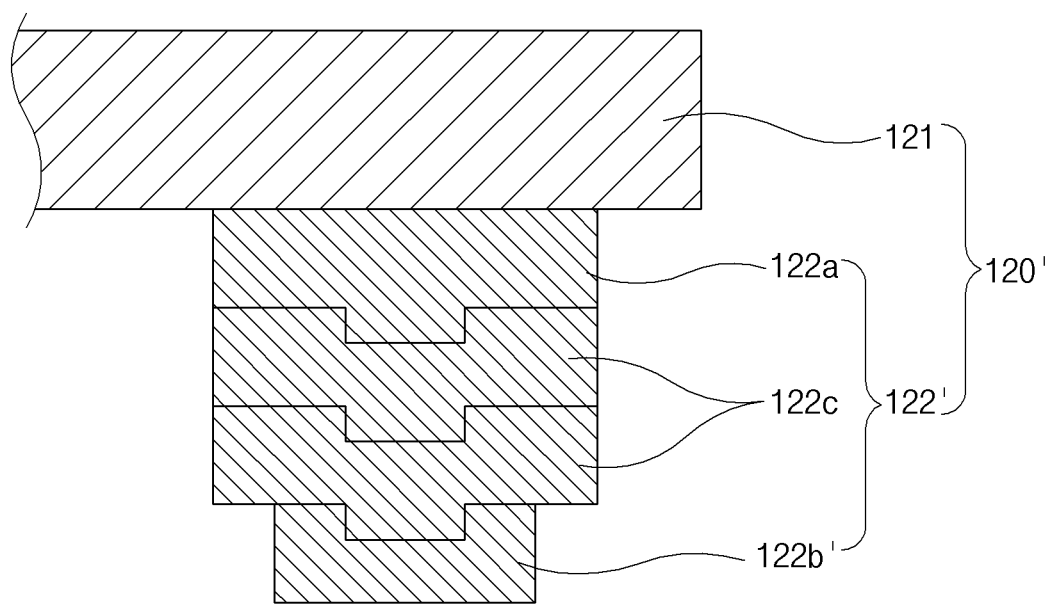
FIG. 10 is a cross-sectional view illustrating another example of the apparatus for pressing the secondary battery according to the third embodiment of the present invention.

As illustrated in FIGS. 9 and 10, an apparatus 100 for pressing a secondary battery according to a third embodiment of the present invention comprises a pressing member 120' comprising a sealing part pressing jig 122'. The sealing part pressing jig 122' comprises a first pressing block 122a, a second pressing block 122b', and one or more third pressing block 122c.

Here, the second pressing block 122b' pressing the sealing part 12b has a width greater or less than that of each of the first and second pressing blocks 122a and 122c. Thus, only the second pressing block 122b' may be replaced to be reused according to the width of the sealing part 12b. As a result, since it is unnecessary to replace the entire sealing part pressing jig 122', convenience of use may be improved.

[Apparatus for Pressing Secondary Battery According to Fourth Embodiment of the Present Invention]

Figure 11:
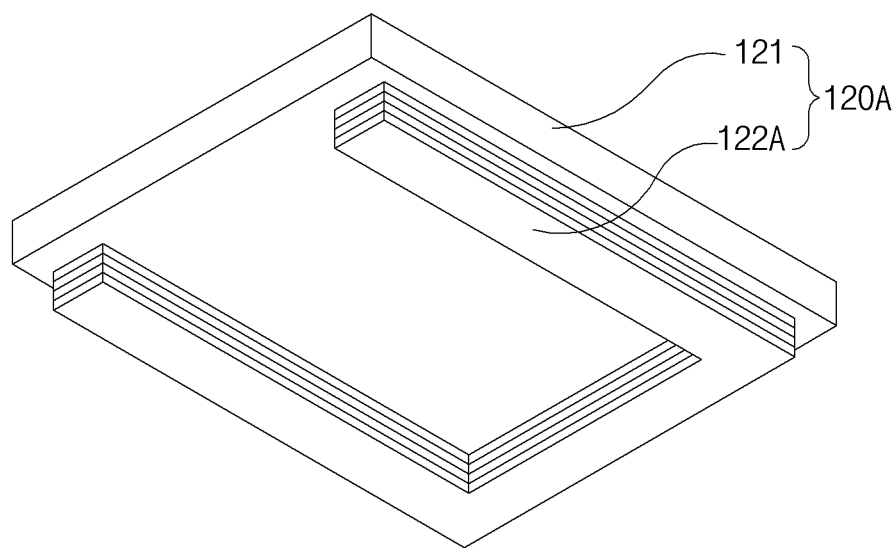
FIG. 11 is a perspective view of an apparatus for pressing a secondary battery according to a fourth embodiment of the present invention.

As illustrated in FIG. 11, an apparatus 100 for pressing a secondary battery according to a fourth embodiment of the present invention comprises a pressing member 120A comprising an accommodation part pressing jig 121 and a sealing part pressing jig 122A. The sealing part pressing jig 122A may have a 'ㄷ' shape to press three surfaces at the same time except for one surface of the pouch 12 provided in the secondary battery 10 from which an electrode lead 13 is drawn out, and thus, the sealing part of the pouch may be stably pressed.

[Apparatus for Pressing Secondary Battery According to Fifth Embodiment of the Present Invention]

Figure 12:
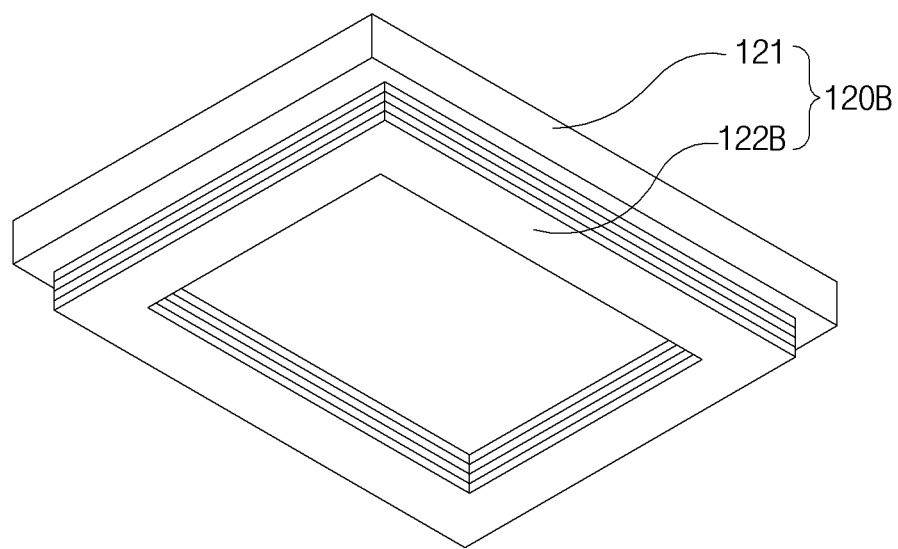
FIG. 12 is a perspective view of an apparatus for pressing a secondary battery according to a fifth embodiment of the present invention.

As illustrated in FIG. 12, an apparatus 100 for pressing a secondary battery according to a fifth embodiment of the present invention comprises a pressing member 120B comprising an accommodation part pressing jig 121 and a sealing part pressing jig 122B. The sealing part pressing jig 122B may have a 'ㅁ' shape to simultaneously press four surfaces comprising one surface of the pouch 12 provided in the secondary battery 10 from which an electrode lead 13 is drawn out, and thus, the sealing part of the pouch may be stably pressed.

Accordingly, the scope of the present invention is defined by the appended claims more than the foregoing description and the exemplary embodiments described therein. Various modifications made within the meaning of an equivalent of the claims of the invention and within the claims are to be regarded to be in the scope of the present invention.

DESCRIPTION OF THE SYMBOLS

100: Apparatus for pressing secondary battery
110: Disposing member
120: Pressing member
121: Accommodation part pressing jig
122: Sealing part pressing jig

The invention claimed is:

1. An apparatus for pressing a secondary battery, the apparatus comprising:
    a disposing member configured to receive thereon the secondary battery comprising an electrode assembly and a pouch; and
    a pressing member configured to press the secondary battery disposed on the disposing member,
    wherein the pressing member comprises:
        an accommodation part pressing jig configured to press an accommodation part of the pouch, in which the electrode assembly is accommodated; and
        a sealing part pressing jig configured to press a sealing part of the pouch formed along an edge surface of the accommodation part,
    wherein the sealing part pressing jig is coupled to a surface of the accommodation part pressing jig corresponding to the sealing part, so that the sealing part pressing jig is configured to press the sealing part using a pressing force transmitted from the accommodation part pressing jig to the sealing part pressing jig.

2. The apparatus of claim 1, wherein the sealing part pressing jig is comprises a plurality of pressing blocks assembled with one another.

3. The apparatus of claim 2, wherein the plurality of pressing blocks comprises a first pressing block coupled to the accommodation part pressing jig, a second pressing block configured to press the sealing part, and one or more third pressing blocks disposed between the first pressing block and the second pressing block.

4. The apparatus of claim 3, wherein each of the first pressing block and the second pressing block has a rigidity greater than a rigidity of each of the third pressing blocks.

5. The apparatus of claim 4, wherein each of the third pressing blocks is made of a material configured to have an elastic restoring force.

6. The apparatus of claim 3, wherein a pressing surface of the second pressing block comprises a plurality of pressing protrusions, such that the sealing part pressing jig is configured to press the sealing part in multiple stages.

7. The apparatus of claim 1, wherein the sealing part pressing jig detachable from the accommodation part pressing jig.

8. The apparatus of claim 1, wherein the sealing part pressing jig is adjustable in position in a direction toward or opposite to a center of the accommodation part pressing jig.

9. The apparatus of claim 3, wherein a pressing surface of the accommodation part pressing jig has an elastic member thereon configured to elastically press the accommodation part of the pouch.

10. A method for pressing a secondary battery, the method comprising:
    disposing a secondary battery comprising an electrode assembly and a pouch on a disposing member; and
    then pressing the secondary battery using a pressing member, wherein the pressing comprises:
- a first pressing process of pressing an accommodation part of the pouch, in which the electrode assembly is accommodated, using an accommodation part pressing jig of the pressing member; and
- a second pressing process of pressing a sealing part formed along an edge surface of the accommodation part using a sealing part pressing jig of the pressing member, wherein the sealing part pressing jig is coupled to the accommodation part pressing jig, so that the sealing part pressing jig presses the sealing part with a pressing force transmitted from the accommodation part pressing jig to the sealing part pressing jig.

11. The method of claim 10, further comprising assembling the sealing part pressing jig after the disposing and before the pressing, wherein, during the assembling, a plurality of pressing blocks having an area corresponding to the sealing part is prepared, and the plurality of pressing blocks comprise a first pressing block, a second pressing block, and one or more third pressing blocks, the plurality of pressing blocks together forming the sealing part pressing jig.

12. The method of claim 11, wherein the first pressing block is coupled to the accommodation part pressing jig, the second pressing block performs the pressing of the sealing part and is disposed outside the first pressing block, and the one or more third pressing blocks are disposed between the first and second pressing blocks.

13. The method of claim 12, wherein each of the first pressing block and the second pressing block is made of a material having a rigidity greater than a rigidity of each of the third pressing blocks, and the third pressing block is made of a material configured to have an elastic restoring force.

14. The method of claim 13, further comprising coupling the sealing part pressing jig to the accommodation part pressing jig after the assembling and before the pressing, wherein, in during the coupling, the sealing part pressing jig is placed on a surface of the accommodation part pressing jig, and a bolt is passed through an oblong hole formed in a surface of the sealing part pressing jig, so that the sealing part pressing jig is coupled to the accommodation part pressing jig by the bolt, and wherein the oblong hole is configured such that the bolt is movable therein to adjust a position of the sealing part pressing jig relative to the accommodation part pressing jig.

15. The method of claim 10, wherein the pressing further comprises coupling an elastic member to a pressing surface of the accommodation part pressing jig, the elastic member pressing the accommodation part of the pouch during the first pressing process.

* * * * *

UNITED STATES PATENT AND TRADEMARK OFFICE
CERTIFICATE OF CORRECTION

| | | |
|---|---|---|
| PATENT NO. | : 12,051,773 B2 | Page 1 of 1 |
| APPLICATION NO. | : 17/786248 | |
| DATED | : July 30, 2024 | |
| INVENTOR(S) | : Lee et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 100 days.

Signed and Sealed this
Thirtieth Day of September, 2025

John A. Squires
*Director of the United States Patent and Trademark Office*